Figure 1:
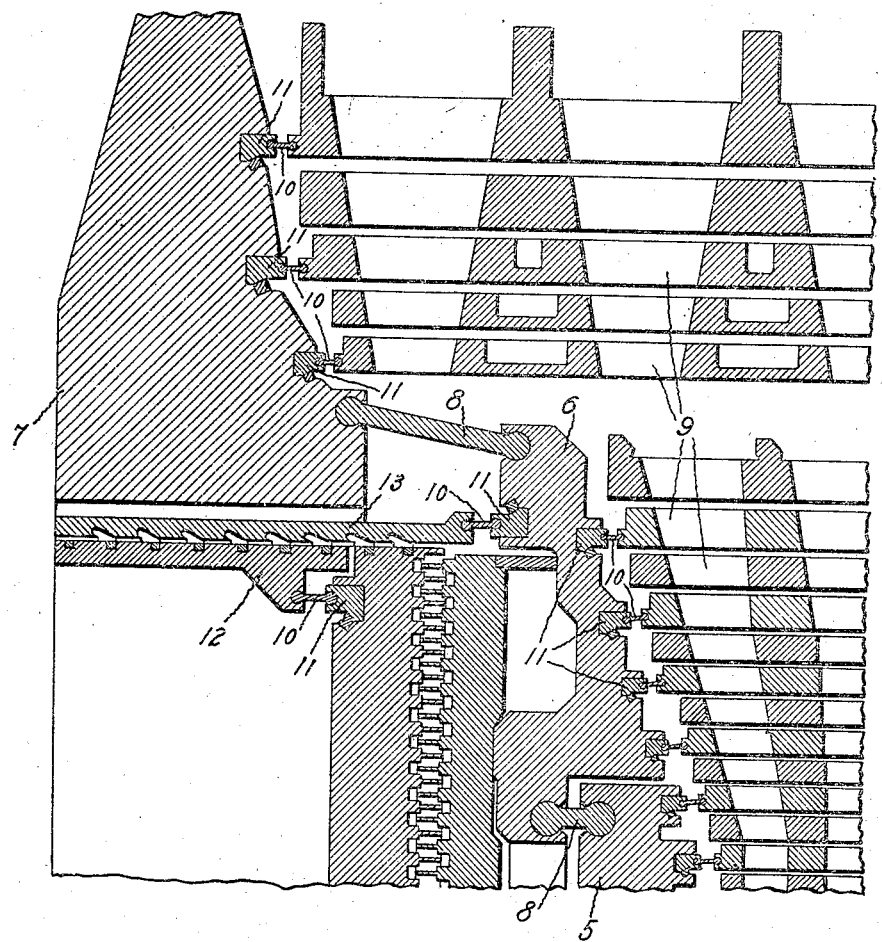

C. STEENSTRUP.
ELASTIC FLUID TURBINE.
APPLICATION FILED JAN. 28, 1918.

1,313,648.

Patented Aug. 19, 1919.

Inventor·
Christian Steenstrup,
by
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

ELASTIC-FLUID TURBINE.

1,313,648.　　　Specification of Letters Patent.　　Patented Aug. 19, 1919.

Application filed January 28, 1918. Serial No. 214,099.

*To all whom it may concern:*

Be it known that I, CHRISTIAN STEEN-STRUP, a citizen of the United States, residing at Schenectady, county of Schenectady, and State of New York, have invented certain new and useful Improvements in Elastic-Fluid Turbines, of which the following is a specification.

The present invention relates to elastic fluid turbines wherein certain parts or annular members are fastened to other parts or annular members by means of expansion rings. Such expansion rings are usually dumb-bell shaped in cross section, the two extremities being fastened in annular grooves in the parts or members to be united by rolling the edges of such grooves over the extremities of the rings, thus providing a connection of a nature which will permit of relative movement of the two parts connected together by the ring. Such expansion rings may be used, for example, to fasten solid rings of blading elements to a rotor or to fasten packing rings to either a moving or stationary part of a turbine. In actual practice occasions arise when it is desirable to remove one or more rings of blading elements or a packing ring or rings from the part to which they are fastened to repair or replace them and it is accordingly not desirable to attach the expansion rings directly in grooves in the member which carries them, for such member may have a number of rings attached to it, and were it damaged in removing an expansion ring it would have to be entirely replaced, which would be very expensive and cause considerable delay. It has accordingly been the practice to fasten an edge of an expansion ring in a groove in a retaining ring, the edges of the groove in the retaining ring being rolled over the edge of the expansion ring, and the retaining ring has then been fastened in the carrying member in a manner which would permit of its removal without danger of injury to the carrying member. It is, however, very important that these retaining rings be firmly anchored in the grooves in the carrying members, for they are subjected to stresses of some magnitude due to expansion and contraction of the turbine parts, and in some cases they are subjected to a pulling action due to unbalanced steam pressures, and should one of them loosen a little, due to any reason, permitting the ring which it carried to sag, it would likely result in serious injury to the turbine.

The object of the present invention is to provide an improved arrangement for fastening retaining rings as referred to above into a carrying member whereby, while it is very firmly anchored in place, it can be readily removed and replaced without danger of injury to the carrying member.

Figure 2:
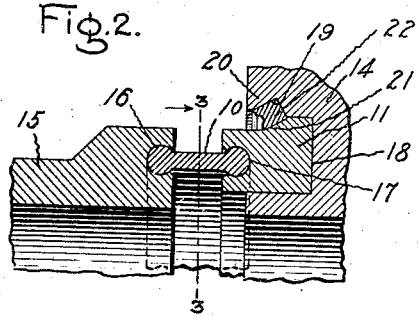

In the drawing, Figure 1 is a radial sectional view of a portion of a turbine showing my invention utilized at various points therein; Fig. 2 is an enlarged section view illustrating the invention, and Fig. 3 is a section taken on line 3—3, Fig. 2.

Referring to the drawing, 5, 6 and 7 indicate rotor parts fastened together by expansion rings 8, and 9 indicates complete rings of blading elements fastened by expansion rings 10 to retaining or seating rings 11, which in turn are fastened in grooves in the rotor parts 5, 6 and 7 in accordance with my invention. 12 and 13 are stationary and rotating packing members respectively fastened by expansion rings 10 to retaining rings 11 which are also held in grooves in the part which carries the packing members in accordance with my invention.

Figure 3:
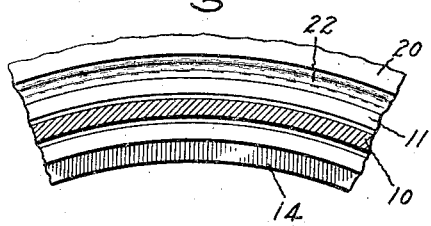

Referring now particularly to Figs. 2 and 3, 10 indicates one of the expansion rings of Fig. 1, 14 a carrying part, 15 a ring to be carried thereby, and 11 a retaining or seating ring. The expansion ring 10 is dumb-bell shaped in cross section and one edge or extremity is fastened in a groove 16 in ring 15 and the other edge or extremity in a groove 17 in retaining ring 11. The edges of grooves 16 and 17 are rolled over the edges of the ring 10 under suitable pressure so as to permit of radial movements of the parts 14 and ring 15 relatively to each other such as may be occasioned by expansion or other causes.

To fasten the retaining ring 11 to the carrying part 14, I provide the carrying part with a rectangular shaped annular groove 18 having one side for a portion of its depth cut away at an angle as indicated at 19 to form an overhanging ledge 20. This forms in substance an annular V-shaped groove at the mouth of the rectangular groove. For the rest of its depth the side having cut-away portion will still be parallel to the opposite side so the bottom of the groove remains rectangular and when the retaining ring 11 is put into place it fits into the rectangular bottom of the groove and is thus accurately positioned. This is important because the various parts are designed with close clearances and must be carefully positioned and firmly held in such positions. I then cut away a portion of a surface of the retaining ring 11, as indicated at 21, at such an angle as to form a wall parallel to the inner surface of the overhanging ledge 20. This then forms an annular groove rectangular in cross section, and into this groove I place a calking ring 22 which may for convenience be divided into lengths. The calking ring 22 overlaps both the carrying part 14 and the retaining ring 11 as is very clearly shown in Fig. 2, and very firmly anchors the retaining ring 11 in annular groove 18 so that a pull on ring 15 in a direction to the left, as shown in Fig. 2, cannot dislodge it. In fact to dislodge the retaining ring it would be necessary to shear the calking ring 22, a thing which obviously could not well occur. Furthermore the ring 22 while being calked into place forces the retaining ring 11 firmly into the bottom of annular groove 18, thus insuring that it is properly positioned, and as will be clear, the driving into place of the calking ring cannot disturb the accurate positioning of the retaining ring 11 in the groove.

To replace a ring 15 the calking ring 22 is first removed, as it may be by suitable tools, and then the retaining ring 11, after which the removed ring 15 may be repaired and replaced or a new one substituted therefor.

In any event the work can be readily done without danger of injury to the carrying part.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

In an elastic fluid turbine, the combination with a ring to be carried, a retaining ring, and an expansion ring fastening the ring to be carried to the retaining ring, of a carrying part, and means for fastening the retaining ring thereto, comprising a rectangular groove in the carrying part into which the retaining ring fits, said groove having an edge cut back at an angle to form an overhanging ledge thereby providing a V-shaped annular channel at the mouth of said rectangular groove, the retaining ring being provided with a cut-away portion on one side to form an angular wall complementary to the angular wall of said ledge, said retaining ring fitting into the bottom of said rectangular groove to position the ring, and a calking ring located in the recess formed between said angular walls, whereby said retaining ring is accurately positioned in said rectangular groove and firmly against movement.

In witness whereof, I have hereunto set my hand this 24th day of Jany. 1918.

CHRISTIAN STEENSTRUP.